May 12, 1953 E. SCHWEITZER 2,638,349

TONE ARM INDEXING DEVICE

Filed June 13, 1949 2 Sheets-Sheet 1

INVENTOR.

Erich Schweitzer

BY

Popp and Popp

Attorneys.

INVENTOR.
Erich Schweitzer
BY
Popp and Popp
Attorneys.

Patented May 12, 1953 2,638,349

UNITED STATES PATENT OFFICE 2,638,349

TONE ARM INDEXING DEVICE

Erich Schweitzer, Buffalo, N. Y., assignor to Markel Electric Products, Inc., Buffalo, N. Y., a corporation of New York Application June 13, 1949, Serial No. 98,672

3 Claims. (Cl. 274—15)

This invention relates to a tone arm indexing device for a record changer adapted to play various sizes of disk records and more particularly to the manual adjustment of the positioning or indexing mechanism of the tone arm to bring the stylus of the tone arm into the starting groove of any selected size of records.

One of the principal objects of the invention is to provide such a manual adjustment responsive to the positioning mechanism for the tone arm which is extremely simple and inexpensive in construction and will accurately return the stylus to the starting groove of either of two different sized records.

Another object is to provide such a manual adjustment which will not itself get out of adjustment.

Another purpose is to provide such an adjustment which is readily set to one or the other of its positions by one lacking mechanical skill.

Another object is to provide such a manual adjustment which can be incorporated in a record changer already having a manual indexing or positioning adjustment for two sizes of records for the purpose of accommodating a third size of records.

Other objects and advantages of the invention will appear from the following description and drawings in which.

Figure 1:
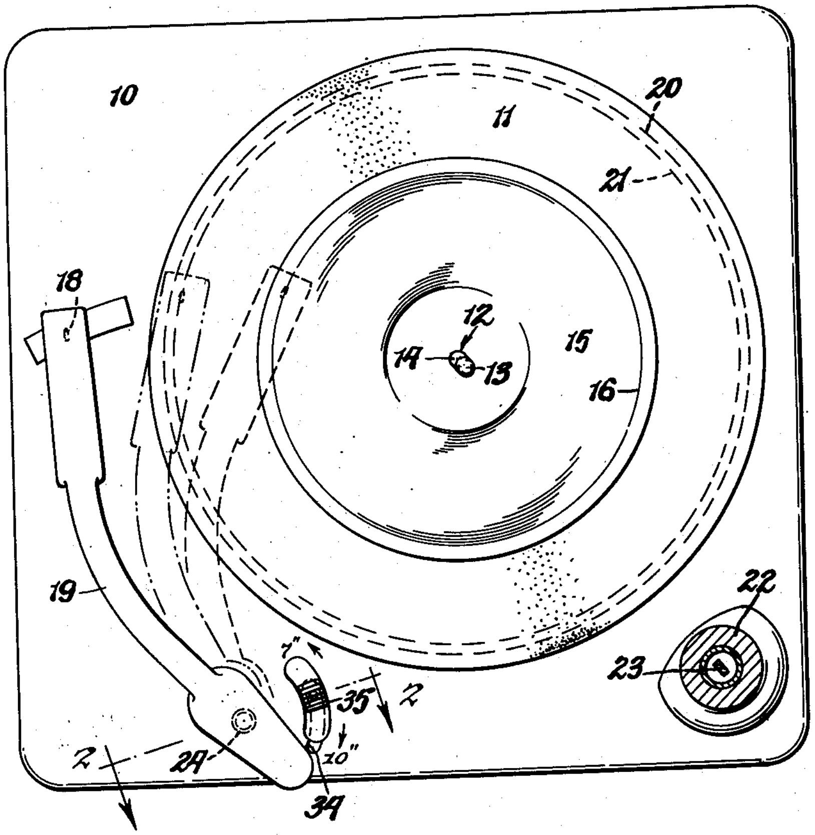
Figure 1 is a top plan view, with parts broken away, of a record changer having a tone arm positioning mechanism provided with a manual adjustment embodying the present invention to adapt it to records of different sizes.
Figure 2:
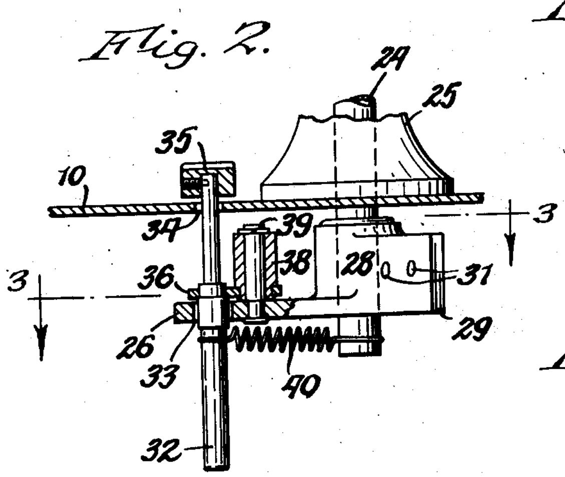
Figure 2 is a fragmentary vertical section taken on line 2—2, Figure 1.

The invention is shown in conjunction with a conventional form of record changer having a metal base plate 10 supporting a conventional turntable 11 revolving around a stationary center post 12 having an offset 13 providing a seat 14 on which a stack of records to be played are supported. The turntable 11 is shown as carrying a seven inch record 15 in playing position, this record being shown as having a marginal starting groove 16 in which the stylus 18 of the tone arm 19 is positioned when the positioning mechanism is adjusted to play seven inch records. The turntable is also adapted to carry, say, a ten inch record 20 in playing position, this ten inch record having a starting groove 21.

The lowermost record of the stack of either seven or ten inch records supported on the shoulder 14 of the center post 12 is pushed off this seat to fall to playing position on the turntable 11 by a mechanism including a hollow post 22 housing an actuating lever 23 operating a record push off mechanism mounted on the hollow post 22. This push off mechanism forms no part of the present invention and hence is not shown.

Figure 3:
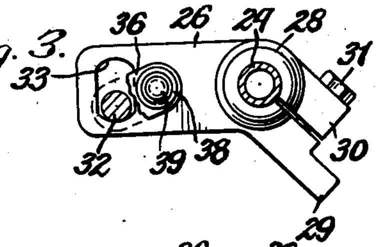
Figures 3 and 4 are fragmentary horizontal sections taken on line 3—3, Figure 2, Figure 3 showing the position of the parts to bring the stylus of the tone arm to the starting groove of, say, a seven inch record and Figure 4 showing the position of the parts to bring the stylus of the tone arm to, say, the starting groove of a ten inch record.
Figure 4:
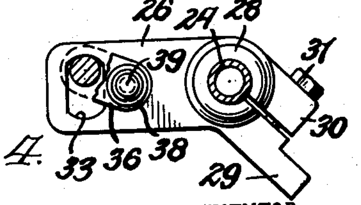

The tone arm 19 is mounted on a vertical tone arm shaft or sleeve 24 extending through the base plate 10 and journalled in and supported by a tone arm post 25 in any suitable manner. Below the base plate 10, an actuating arm 26 is fast to this vertical tone arm shaft 24. This actuating arm is shown as formed integrally with a hub 28 which is split and provided with a pair of clamping ears 29, 30 on opposite sides of the split and which are drawn together by a clamping screw 31 so as to clamp the hub 28 to the vertical tone arm shaft 24. The actuating arm 26 is of rectangular form and is short and relatively broad in a horizontal direction as best shown in Figures 3 and 4.

This actuating arm 26 carries an indexing member or vertical pin 32 which is manually movable to two different positions transversely of the actuating arm. For this purpose this indexing pin extends through a transverse slot 33 extending vertically through the outer end of the actuating arm 26 and also extends through an arcuate slot 34 in the base plate 10 of the record changer. This last slot 34 is concentric with the axis of the vertical tone arm shaft 24 and above this slot a finger piece or knob 35 is mounted on the indexing pin 32 by means of which this indexing pin can be moved manually to one end or the other of the slot 33 in the actuating arm 26.

This indexing pin 32 is shown as carried by a small adjusting arm 36 fast to the lower end of a small cylindrical sleeve 38 rotatably mounted on a pin 39 fast to and projecting upwardly from the actuating arm 26. This pin 39 is located along the centerline of the actuating arm 26 between the slot 33 and vertical tone arm shaft 24 and close to the slot 33 and relatively remote from the vertical tone arm shaft 24. To yieldingly retain the indexing pin 32 in one end or the other of the slot 33 a helical tension spring 40 is arranged below the adjusting arm 26 and connects the indexing pin 32 with the vertical tone arm shaft 24. It will be seen that when the indexing pin 32 and its small supporting adjusting arm 36 are moved to coincide with the centerline of the actuating arm 26 the spring is on dead center. On moving the indexing pin 32 to either end of the slot 33 the spring 40 is brought to a corresponding side of its dead center position and hence tends to retain the indexing pin at either end of the slot 33.

Any conventional mechanism synchronized with the completion of the playing of each record can be provided to engage and moves the indexing pin 32 to swing the tone arm 19 to the inoperative position shown in full lines in Figure 1 and, following the dropping of another record from the center post shoulder 14 to the turntable 11, to engage and move the indexing pin 32 to swing the tone arm 19 and position its stylus 18 above the starting groove 16 or 21 depending upon whether the indexing pin has been manually set at one end or the other of the slot 33. Such conventional tone arm swinging mechanism is generally illustrated as comprising a stud 45 secured to and extending downwardly from the base plate 10 and carrying a horizontally swinging bell crank lever 46 one end 48 of which is actuated by the usual cam (not shown) which becomes, for a brief interval, operative at the end of the record play. The other arm 49 of this bell crank lever has pivoted thereto, as indicated at 50, an extension 51 which is held in line with the arm 49 by a side stop 52 on the arm 49 when the bell crank lever is swinging in a counterclockwise direction as viewed in Figures 5 and 6, but can swing out of line with the arm 49 when the bell crank lever 46 is swinging in a clockwise direction as viewed in these figures. The extension 51 is normally held in alignment with the arm 49 of the bell crank lever by a helical tension spring 53 which can be secured at one end to an upstanding ear 54 on the extension 51 and anchored at its other end on the base plate 10 in any suitable manner.

Another arm 55 is pivotally mounted on the stud 45 and is yieldingly urged into engagement with an indexing stop 56 by a helical tension spring 58, the arm 55 being thereby yieldingly urged toward the arm 49 of the bell crank lever 46. This stop 56 can be fixed or can be adjustable to, say, ten and twelve inch record indexing positions while the indexing pin 32 can be adjusted to, say, ten and seven inch record indexing positions. This indexing pin 32 is located between the arm 55 and the arm 49, 51 of the bell crank lever 46.

The outer end of the arm 55 is shown as carrying an L-shaped lever 60 having a laterally extending free arm 61 forming with the other or connected arm 62 a V-shaped crotch 63 adapted to catch and position the lower end of the indexing pin 32. This connected arm 62 of the L-shaped lever 60 is pivoted adjacent its center, as indicated at 64, to the end of the arm 55 and at its extremity carries a pin 65 to which one end of a link 66 is slidingly fitted. For this purpose the link 66 is provided at one end with a longitudinal slot 68 through which the shank of the pin 65 extends. The other end of the sliding link 66 is pivoted, as indicated at 69, to the outer end of the arm 49, 51 of the bell crank lever 46.

The L-shaped lever 60 is biased toward one end or the other of its movement about its pivot 64 by an expansive toggle spring 70 one end of which is secured to a pin 71 on the L-shaped lever 60 and the other end of which is secured to a pin 72 on the arm 55. This toggle spring 70 passes beyond dead center in the movement of the parts.

Assuming that the operator desires to play a stack of seven inch records on the spindle, he first holds the tone arm 19 and moves the knob or thumb piece 35 along the slot 34 in the base plate 10 toward the end thereof marked for seven inch records as shown in Figure 1. This shifts the indexing pin 32, on which this thumb piece is mounted, along the slot 33 in the actuating arm 26 to the position shown in Figure 3. In so moving along the slots 34 and 33 the indexing pin swings with its supporting or adjusting arm 36 around the axis of the pin 39 and carries the helical tension spring 40 beyond dead center so that this spring yieldingly holds the indexing pin 32 against the end of the slot 33 shown as engaged in Figure 3. Since this indexing pin has been adjusted to a predetermined arcuate or angular relation to the arm 26 about the vertical axis of the tone arm shaft 24 and since both this arm 26 and the tone arm 19 are compelled to rotate with this tone arm shaft 24, it will be seen that the indexing pin 32 has also been adjusted to a predetermined arcuate or angular relation to the tone arm 19 about its vertical axis of rotation. The length of the slot 33 in this direction is, of course, selected to bring the stylus 18 into a pisition in register with the starting groove 16 of a seven inch record 15 on the turntable 11 in response to the movement of the tone arm positioning mechanism which engages and moves the indexing pin 32.

Figures 5, 6:
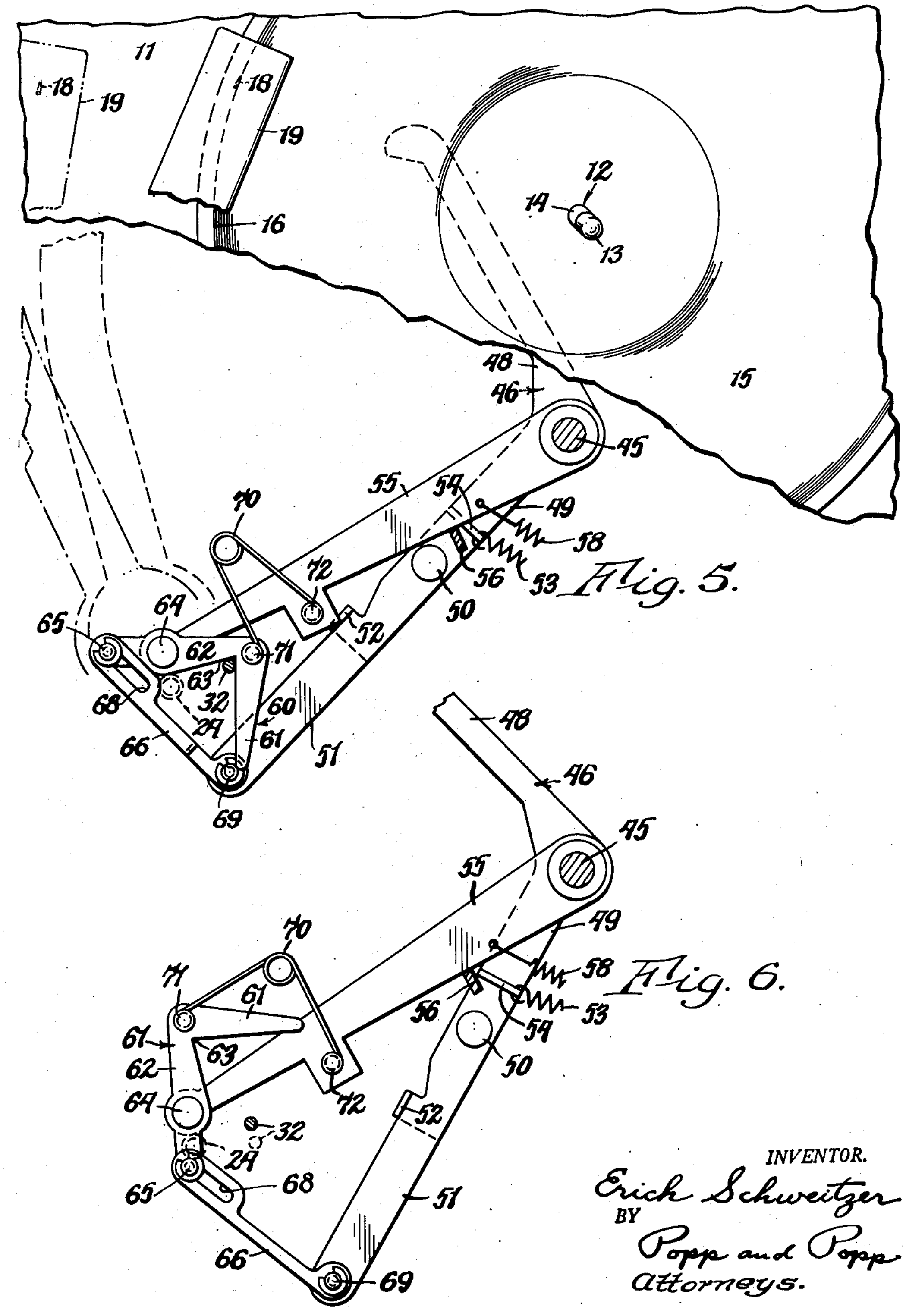
Figure 5 is an enlarged fragmentary view similar to Figure 1 and showing a part of the base plate broken away to show a part of the tone arm positioning mechanism, the parts being shown in the position in which the stylus of the tone arm is positioned above the starting groove of a seven inch record.
Figure 6 is a fragmentary view similar to Figure 5 and showing a subsequent position of the parts in which the tone arm is free to follow the sound groove of the record in playing the same.

At the completion of play of each seven inch record 15 on the turntable the bell crank lever 46 is swung clockwise as viewed in Figures 5 and 6 by a cam (not shown) which becomes operative for an interval as for one revolution following each record play and when the record changer is initially started. This clockwise movement of the bell crank lever 46 causes its jointed arm 49, 51 to engage the lower end of the indexing pin 32 and move it horizontally in a counterclockwise direction as viewed in Figures 5 and 6 about the axis of the vertical tone arm shaft 24. This movement of the indexing pin 32 effects a corresponding counterclockwise movement of the arm 26 and tone arm shaft 24 as viewed in Figure 3 and also a corresponding counterclockwise movement of the tone arm 19 as viewed in Figure 1. This movement of these parts continues until the tone arm reaches the full line position shown in Figure 1 in which it is completely removed from the record playing zone so that the lowermost record of the stack supported on the seat 14 of the centerpost 12 can be pushed off this seat by the mechanism (not shown) mounted on the post 22 and to fall upon the turntable 11.

It will be noted that by reason of the spring loaded jointed form of the arm 49, 51 of the bell crank lever, if the tone arm 19 is manually restrained during this movement to its outermost inoperative position no parts will break, the extension 51 merely swinging out of line with its bell crank lever arm 49 against the resistance of its spring 53 to accommodate such restraint of the tone arm 19.

At approximately the same time that the jointed lever 49, 51 so engages the indexing pin 32 to start movement of the tone arm 19 to its outermost inoperative position, it also brings the pin 65 to the near end of the slot 68, this being effected, of course, by the jointed lever arm 49, 51 pushing, through its pivot pin 69, on the slotted link 66. Accordingly while the indexing pin 32 is so being moved by direct engagement of the jointed arm 49, 51 to swing the tone arm 19 out of the record playing zone, the L-shaped lever 60 is also being pushed, by the slotted link 66, in a clockwise direction to embrace the indexing pin 32. When this L-shaped lever 60 so swings beyond a position where the anchoring pin 71 has passed beyond a line intersecting the pins 64 and 72, the toggle spring 70, which tends to spread, is carried beyond dead center and hence acts to urge the L-shaped lever clockwise as viewed in Figures 5 and 6 and into continued engagement with the indexing pin 32.

The final part of this clockwise movement of the jointed lever 49, 51, through the slotted link 66, and through L-shaped lever 60 now restrained by the indexing pin 32, moves the lever 55 clockwise, as viewed in Figures 5 and 6, a short distance away from its fixed stop 56.

The main cam (not shown) now swings the bell crank lever counterclockwise as viewed in Figures 5 and 6. This relieves the pressure against the arm 55 and permits its return spring 58 to bring this arm 55 against the stop 56. At the same time the indexing pin 32, now engaged in the crotch 63 of the L-shaped lever 60 is moved, by the pressure of the return spring 58, clockwise, as viewed in Figures 5 and 6, about the axis of the vertical tone arm shaft 24 and to its indexed position for a seven inch record. This clockwise movement of the indexing pin 32 swings the tone arm 19 as viewed from above clockwise to a position where its stylus 18 is arranged above the starting groove 16 of a seven inch record.

The continued counterclockwise movement of the jointed lever 49, 51 brings the pin 65 to the far end of the slot 68 in the slotted lever 66 so as to start the counterclockwise rotation of the L-shaped lever 60 and to free the indexing pin 32 from its crotch 63. At the start of this counterclockwise movement of the L-shaped lever 60 the letdown mechanism (not shown) goes into action. Since at this time the indexing pin 32 is in its indexed position for seven inch records, the stylus 18 of the tone arm is set down in the starting groove 16 of the seven inch record 15 on the turntable and the tone arm is thereafter held against lateral movement until playing of the record is completed. This position of the parts is illustrated in Figure 5.

The continued counterclockwise movement of the jointed lever 49, 51 effects a continued counterclockwise movement of the L-shaped lever 60 so as to free the indexing pin 32 and permit it to move with the tracking of the stylus along the playing groove of the record. When the stylus 18 of the tone arm 19 is in the starting groove of a seven inch record, the indexing pin 32 is in its indexed position illustrated by full lines in Figures 5 and 6. When the stylus 18 reaches the end of the playing groove of the record 15, the indexing pin 32 is in the dotted line position shown in Figure 6. During record play the indexing pin 32 must be free, of course, to move from the full to the dotted line position shown in Figure 6 and the counterclockwise withdrawal of the L-shaped lever 60 effects this object.

The continued counterclockwise movement of the jointed lever 49, 51 and L-shaped lever 60 causes the toggle spring anchoring pin 71 to pass beyond a line intersecting the axes of the pins 64 and 72. Accordingly the toggle spring 70 is again moved beyond dead center and its expansive force tends to urge the L-shaped lever 60 to its inoperative position shown in Figure 6, this view showing the position of the parts at the start of the described sequence.

When the operator desires to play, say, ten inch records 20 instead of the seven inch records 15, in addition to placing ten inch records on the centerpost seat 14 the operator also seizes the tone arm 19 and moves the finger piece 35 toward the end of the base plate slot 34 designated as the ten inch record end in Figure 1. This shifts the indexing pin 32 from position at one end of the slot 33 illustrated in Figure 3 to the position illustrated in Figure 4. In so shifting the indexing pin from one end of the slot 33 to the other, the indexing pin swings about the pin 39 carrying the adjusting arm 36 which supports the indexing pin. In so swinging the spring 40 is carried beyond dead center so that it now tends to hold the indexing pin 32 at the end of the slot 33 as shown in Figure 4. In this position the indexing pin is set to position the stylus 18 above the starting groove 21 of a ten inch record 20 on the turntable. In other words, the angular relation of the tone arm 19 and indexing pin 32 about their common axis of the vertical tone arm shaft has been altered so that when the indexing pin 32 has been moved to the position shown in Figure 5 the stylus 18 will be positioned above the starting groove 21 of a ten inch record 20 on the turntable. In other respects the sequence of operation is the same as that previously described.

From the foregoing it will be seen that the present invention accomplishes the enumerated objects in a very simple and sturdy mechanism.

I claim:

1. In a record changer having a turntable adapted to support records of different sizes, a vertical tone arm shaft alongside said turntable, a tone arm having a stylus and mounted on said tone arm shaft to swing horizontally therewith, and a positioning mechanism for moving said tone arm horizontally to position said tone arm at the start of each record play, the combination therewith of a manual adjustment for indexing said stylus to a position above the starting groove of either of two different sized records on said turntable in response to the movement of said positioning mechanism, comprising an actuating arm fixed to said tone arm shaft to swing horizontally therewith, an adjusting arm pivoted on said actuating arm to swing about a vertical axis remote from the axis of said tone arm shaft, a vertical indexing pin mounted on the free end of said adjusting arm and arranged in the path of said positioning mechanism to be moved thereby about the axis of said tone arm shaft, a pair of stops on said actuating arm limiting the transverse movement of said indexing pin relative to said adjusting arm and arranged to position said indexing pin at two different positions on said actuating arm corresponding to the two different positions of the starting grooves of said two different sized records and means restraining said indexing pin against one or the other of said stops comprising a spring mounted on said actuating arm on the side of the pivot axis of said adjusting arm opposite said adjusting arm and connected with said adjusting arm to be carried beyond dead center in the movement of said indexing pin from one of said stops to the other.

2. In a record changer having a turntable adapted to support records of different sizes, a vertical tone arm shaft alongside said turntable, a tone arm having a stylus and mounted on said tone arm shaft to swing horizontally therewith, and a positioning mechanism for moving said tone arm horizontally to position said tone arm at the start of each record play, the combination therewith of a manual adjustment for indexing said stylus to a position above the starting groove of either of two different sized records on said turntable in response to the movement of said positioning mechanism, comprising an actuating arm fixed to said tone arm shaft to swing horizontally therewith, said actuating arm being provided with a transverse slot extending vertically therethrough, an adjusting arm pivoted to said actuating arm to swing about a vertical axis disposed intermediate said slot and said tone arm shaft, a vertical indexing pin fast to said adjusting arm and extending through said slot and arranged in the path of said positioning mechanism to be moved thereby about the axis of said tone arm shaft, the ends of said slot limiting the movement of said indexing pin and adjusting arm to position said indexing pin at two different positions on said actuating arm corresponding to the two different positions of the starting grooves of said two different sized records.

3. In a record changer having a base plate, a turntable above said base plate and adapted to support records of different sizes, a vertical tone arm shaft journalled in said base plate alongside of said turntable and extending above and below said base plate, a tone arm having a stylus and mounted above said base plate on said tone arm shaft to swing horizontally therewith, and a positioning mechanism below said base plate for moving said tone arm horizontally to position said tone arm at the start of each record play, the comibnation therewith of a manual adjustment for indexing said stylus to a position above the starting groove of either of two different sized records on said turntable in response to the movement of said positioning mechanism, comprising an actuating arm fixed below said base plate to said tone arm shaft to swing horizontally therewith, said actuating arm being provided with a transverse slot extending vertically therethrough, an adjusting arm pivoted to said actuating arm to swing about a vertical axis disposed intermediate said slot and said tone arm shaft, a vertical indexing pin fast to said adjusting arm and extending through said slot and arranged in the path of said positioning mechanism to be moved thereby about the axis of said tone arm shaft, the ends of said slot limiting the movement of said indexing pin and adjusting arm to position said indexing pin at two different positions on said actuating arm corresponding to the two different positions of the starting grooves of said two different sized records, a spring secured to said actuating arm intermediate said pivot axis of said adjusting arm and said tone arm shaft and connected with the free end of said adjusting arm to be carried beyond dead center in the movement of said indexing pin from one end of said slot to the other thereby to yieldingly restrain said indexing pin at one end or the other of said slot, said indexing pin extending upwardly through another slot provided in said base plate, and a finger knob on said indexing pin above said base plate to facilitate adjustment of said indexing pin from one end to the other of said first slot.

ERICH SCHWEITZER.

References Cited in the file of this patent

UNITED STATES PATENTS

| Number | Name | Date |
|---|---|---|
| 2,246,130 | Forstrom | June 17, 1941 |
| 2,295,460 | Farrow | Sept. 8, 1942 |
| 2,300,149 | Guedon | Oct. 27, 1942 |
| 2,328,703 | Becwar | Sept. 7, 1943 |
| 2,517,165 | Ascoli | Aug. 1, 1950 |